United States Patent [19]

Pine

[11] 4,254,907
[45] Mar. 10, 1981

[54] PORTABLE TRACTION TRACK FOR VEHICLE DRIVING WHEEL

[76] Inventor: Danny R. Pine, Box 19, Tarlton, Ohio 43156

[21] Appl. No.: 50,984

[22] Filed: Jun. 22, 1979

[51] Int. Cl.³ .......................................... E01B 23/00
[52] U.S. Cl. .................. 238/14; 238/10 R; 238/166
[58] Field of Search ............... 238/14, 10 R, 166; 152/208, 213 R, 213 A; 305/47

[56] References Cited

U.S. PATENT DOCUMENTS

| | | | |
|---|---|---|---|
| 1,072,273 | 9/1913 | Thull | 238/166 |
| 1,075,377 | 10/1913 | Phillips | 238/14 |
| 1,344,238 | 6/1920 | Lavallee | 238/14 |
| 1,370,905 | 3/1921 | Newdick | 238/14 |
| 1,373,042 | 3/1921 | Workman | 238/14 |
| 3,658,327 | 4/1972 | Thiede | 238/10 R X |
| 4,211,366 | 7/1980 | Czarnota | 238/14 |

FOREIGN PATENT DOCUMENTS 221133  8/1942  Switzerland ........................ 238/166

*Primary Examiner*—Randolph A. Reese
*Attorney, Agent, or Firm*—Francis T. Kremblas, Jr.

[57] ABSTRACT

An improved portable traction track for a vehicle driving wheel which is characterized by a plurality of base sections flexibly connected to one another to form an elongate strip adapted to be pulled under a rotating driving wheel. Each of the base sections include transversely spaced vertical side walls which have longitudinally spaced edges which are disposed in predetermined angular relationship to the edges of the immediately adjacent side walls in a decreasing angular relationship from the front toward the rear of the strip. The edges of the side walls are also provided with locking features such that upon flexing of the base sections in one direction, the side sections engage one another to permit only predetermined amount of flexing of that portion of the strip. This construction provides a bridge effect as the vehicle wheel rotates and pulls the strip under the wheel to the point at which the wheel is driven out of the rut in which it is stuck.

7 Claims, 5 Drawing Figures

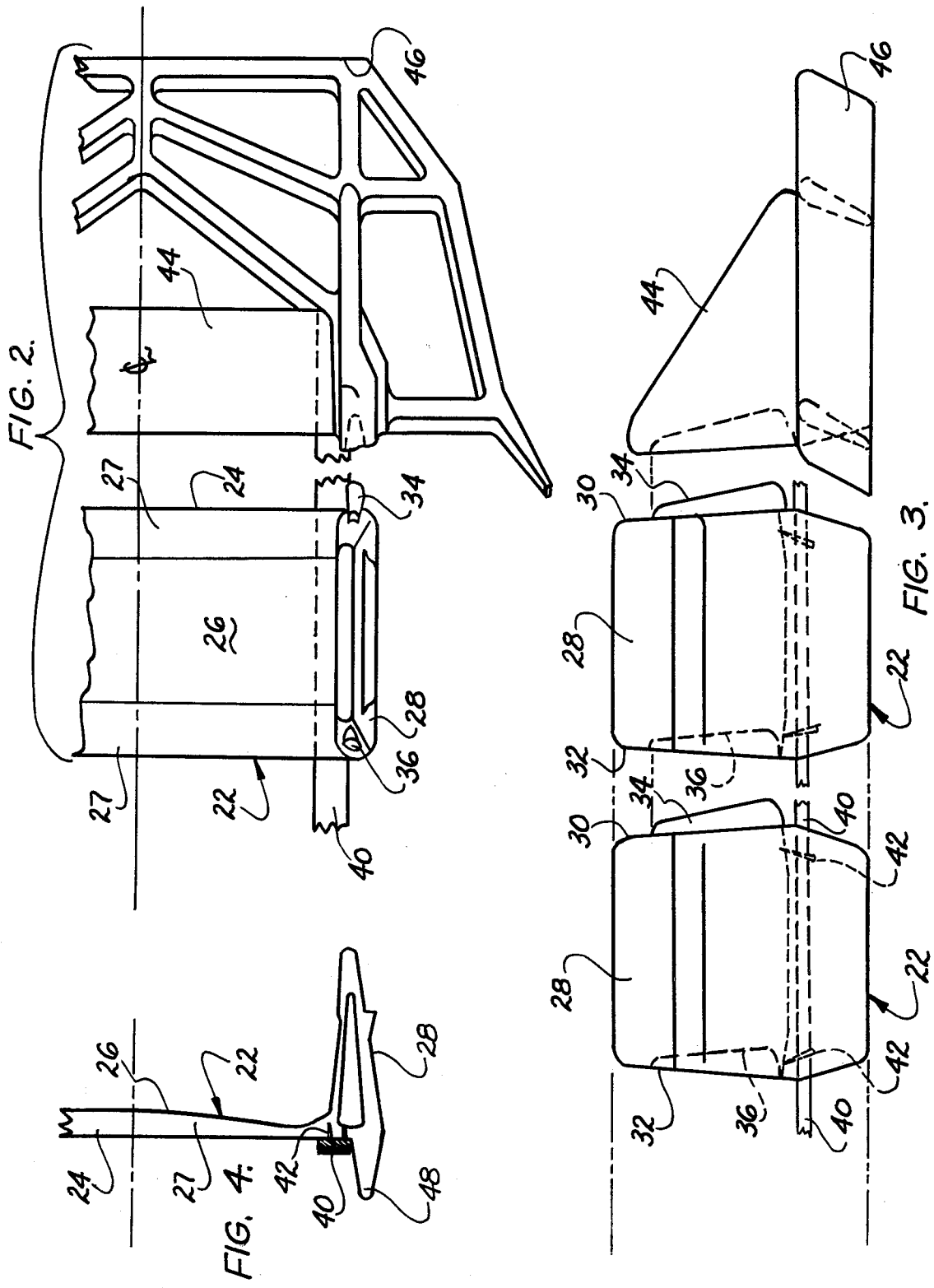

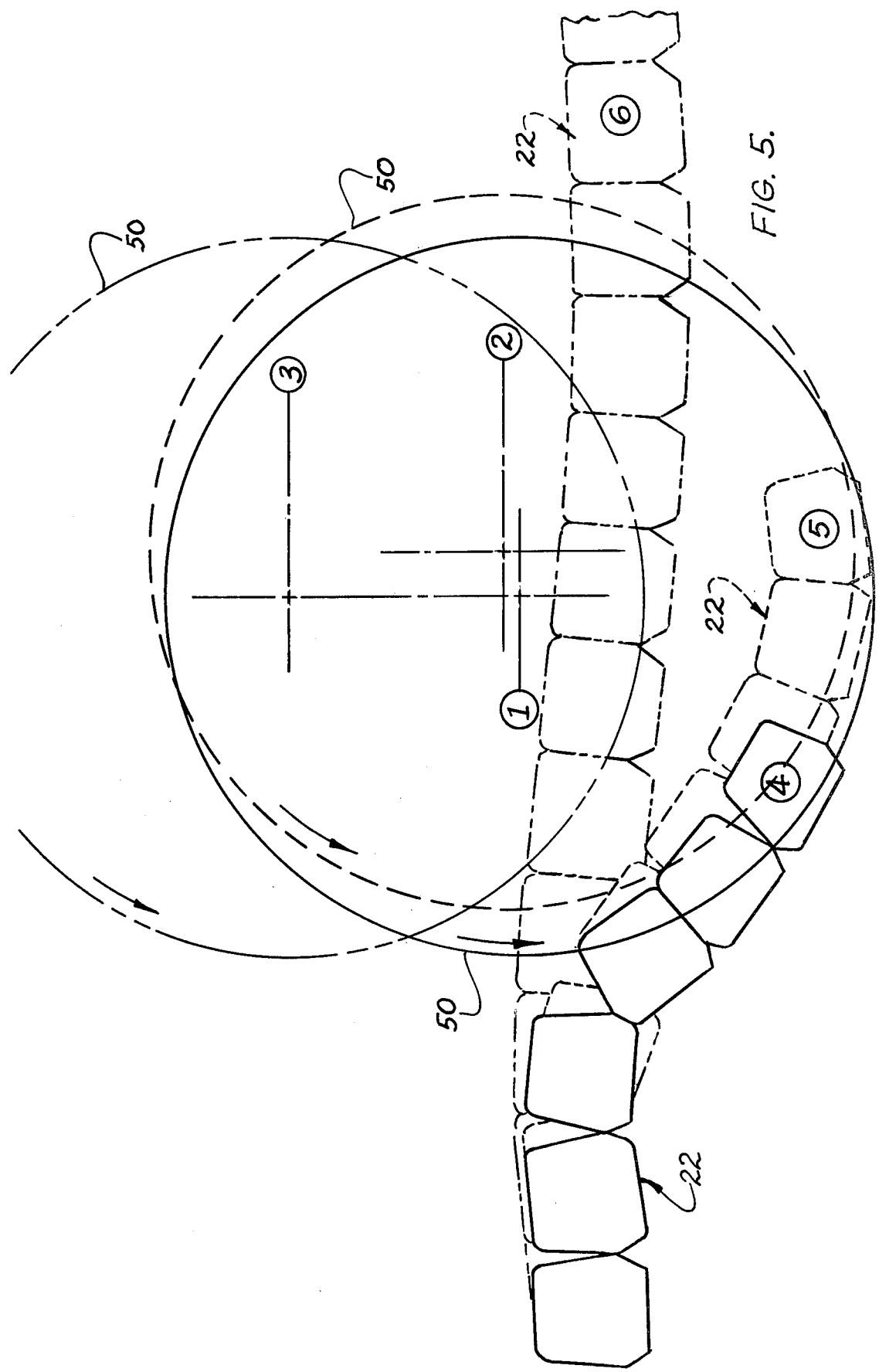

PORTABLE TRACTION TRACK FOR VEHICLE DRIVING WHEEL

BACKGROUND

A longstanding problem which continues to affect most vehicle owners is the situation in which the driving wheel or wheels are stuck in snow or mud and particularly when a hole or rut is formed while the operator has attempted to extricate himself from this circumstance.

Numerous devices have been proposed in the past with varying degrees of effectiveness, but none have been totally satisfactory in dealing with such problems. Some are reasonably successful for those situations requiring merely some additional friction to prevent slipping between the tire and the ground surface. However, none really address the problem encountered when a relatively deep hole or rut is formed in initial attempts to move the wheel from the soft earth or snow.

Representative of the prior devices are the following U.S. Pat. Nos. 3,708,117; 3,997,110; 1,574,729; 1,468,023; and 1,324,291.

Of the many forms and designs, ranging from flexible strips to rigid plates, none appears to be satisfactorily helpful in the difficult situation of being mired helplessly in a deep rut or hole. Many motorists have experienced such a situation, and without the aid of several helpers, have had to rely on an expensive tow truck service call to receive effective aid.

SUMMARY OF THE INVENTION

The present invention relates to a vehicle traction track of the like and particularly to such a device which not only provides a high friction surface under the driving wheel, but further, uniquely provides a bridging effect which tends to reduce the depth of a hole or rut in which the wheel is stuck.

The traction track of the present invention comprises a series of base sections flexibly connected to one another to form an elongate track or strip. Each base section is provided with vertically extending, transversely spaced side walls. The side walls are provided with longitudinally spaced edge portions which form predetermined angles with the next adjacent base section. The angular relationship is generally decreasing from the front of the strip toward the rear such that the strip can only be flexed in one direction a predetermined but varying degree as it is pulled under the vehicle wheel.

In this manner, as the abrasive top portion of the base sections are engaged by the driving wheel, the strip is pulled under the wheel. However, as the strip is being pulled under the wheel, the flexibility of the strip is reduced because of the limitation provided when the side walls engage the next adjacent side wall. Therefore as the driving wheel pulls the strip farther under the wheel, a bridging effect occurs due to the wedging of a less curved contour of the strip under the wheel to effectively form a ramp of lesser slope than the slope of the hole in which the wheel is disposed.

As the wheel encounters less of an incline, it is more easily able to drive forward on the strip and out the hole or rut in which it was stuck. On the other hand, as the force necessary to pull the strip under the wheel becomes greater, the wheel may have enough traction to drive out of its position to free itself prior to pulling the strip through most of its length under the tire. Either way, the motorist becomes free of this frustrating situation.

OBJECTS

It is a primary object of the present invention to provide an improved portable traction track which is uniquely constructed not only to provide an increase in frictional gripping but also to provide means to effectively reduce the height of a rut or hole into which the wheel is stuck.

It is another object of the present invention to provide a device of the type described which includes a novel series of base portions which are flexibly connected to one another to form a decreasing curvature as it is pulled beneath the driving wheel and which are releasably locked in a supporting relationship to effectively reduce the depth of a hole or rut in which the wheel is disposed.

It is another object of the present invention to provide a device of the type described which is constructed such that it may be stored in a relatively compact configuration when it is not in use.

It is a further object of the present invention to provide a device of the type described which incorporates the above described advantages and yet may be manufactured at reasonable cost.

IN THE DRAWINGS

FIG. 2 is a partial top view of a portion of the device shown in FIG. 1 illustrating adjoining base sections in an exploded relationship;

FIG. 3 is a partial side view similar to FIG. 2 showing adjoining base sections in exploded relationship;

FIG. 4 is a partial front elevational view of a typical base section comprising a portion of the device of the preceding Figures shown in isolated relationship from the remainder of the device; and FIG. 5 is a diagrammatic view of a portion of the device shown in FIG. 1 illustrating the driving wheel of a vehicle disposed in a hole or rut.

DETAILED DESCRIPTION

Figure 1:
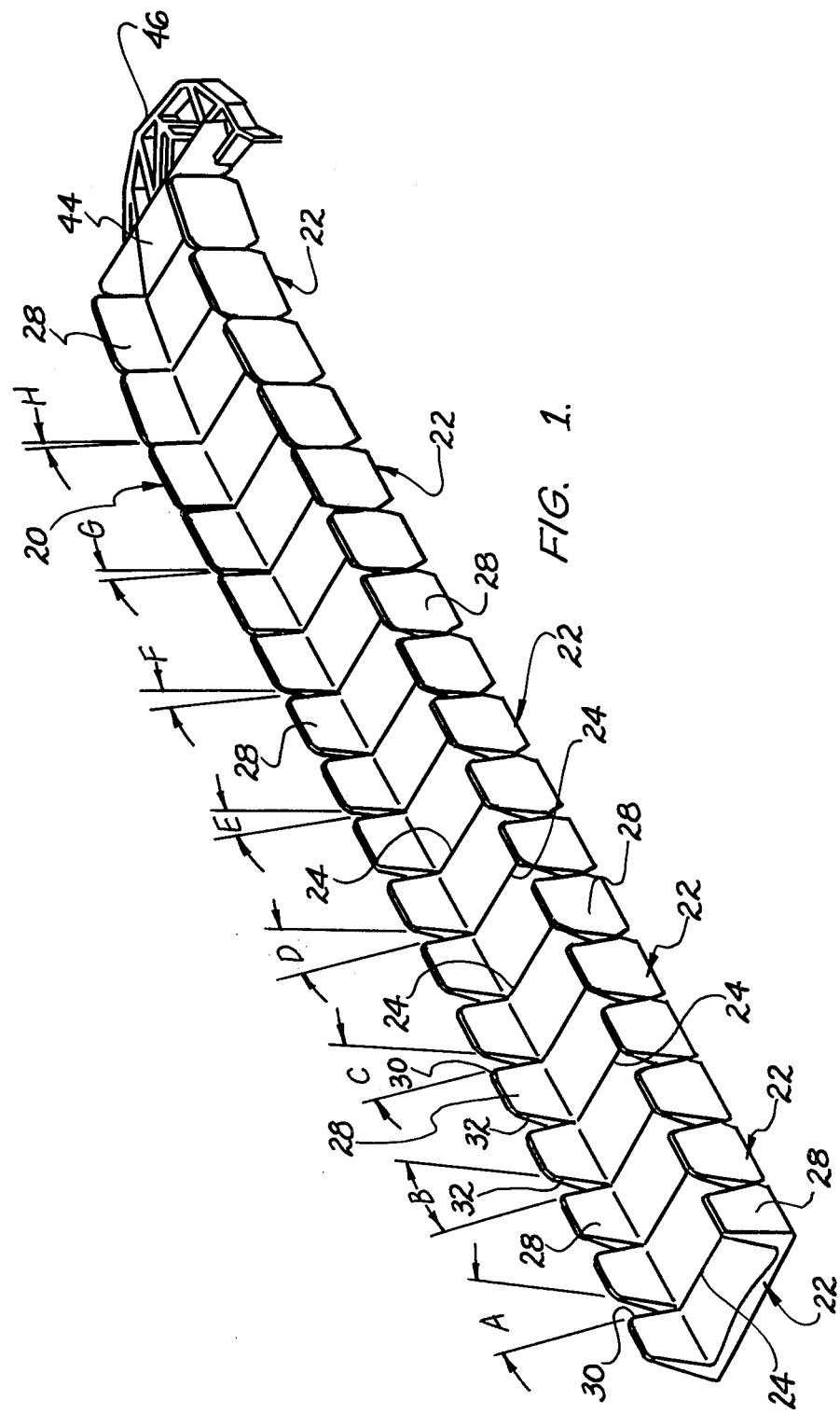
FIG. 1 is a perspective view of a vehicle traction track constructed in accordance with the present invention.

An improved traction track for vehicle driving wheels constructed in accordance with the present invention is illustrated in FIG. 1 and comprises an elongate track or strip, indicated generally at 20, which includes a plurality of base sections, such as indicated generally at 22. Each base section 22 is attached to an adjacent base section in a flexible or hinged relationship along their laterally extending edge portions 24.

Each base section 22 includes a horizontally disposed base surface 26 and vertically disposed and transversely spaced side walls 28. Preferably the base surface 26 and side walls 28 are integrally formed to comprises a one piece unit.

Each pair of opposing side walls 28 are provided with longitudinally spaced edge portions 30 and 32 which are formed with a predetermined angular configuration such that when the strip is horizontally disposed a predetermined angular relationship exists between the corresponding edges 30 and 32 of the next adjacent side wall associated with the next adjacent base section 22.

This angular relationship between adjacent edges is indicated by the angles A thru H in FIG. 1 and preferably decreases a given amount from the front toward the rear of strip 22 at least for a substantial portion of its length.

The last few base sections 22 at the rearward portion of the strip may be provided with a zero angular relationship or a small negative angle relative to the angular relationship of the forward sections.

Further the longitudinally spaced edges such as 30 and 32 of each side wall 28 are provided with a tongue 34 and a groove 36 respectively which are adapted to mate with a corresponding tongue and groove formed on the adjacent side walls 28 associated with the next adjacent base sections 22 to form a releasable locking means between the side walls upon flexing of the strip 20 downwardly as seen in FIG. 1.

Therefore it can be seen that the angular relationship between the longitudinally extending edges 30 and 32 of each of the side walls defines the limit to which each base section can flex relative to the next adjacent base section in at least one direction about the flexible connection between each base section 22.

A reinforcing strip of strong, flexible material 40, such as fiberglass or other suitable material, is fastened along the bottom of each individual base section 22, such as by metal staples 42 or the like, and extends along the lateral edges of the bottom of each base section 22 the entire length of the strip 20. Alternatively, each base section 22 could be hinged to each adjacent base section.

Preferably, an abrasive material, such as small gravel or the like is fixed to the upper surface of base surface 26, by an adhesive or the like, to provide for increased frictional engagement with the tire treads on a driven wheel.

The base section 22, indicated specifically at 44, at the rearward end of strip 20 is fixed to a ground surface gripping device 46.

Gripping device 46 may be of any convenient form which will readily embed itself into the ground surface upon receiving the weight of the vehicle. Or it may, in some instances, be manually driven into the mud, snow or particularly ice, to anchor the strip at its rearward end after a sufficient length of the strip 20 has been pulled under the wheel.

In the configuration shown, gripping or anchoring member 46 is the form of a relatively wide series of ribs connected to one another and presenting relatively thin edges groundwardly.

Referring specifically to FIG. 4, each base surface 26 is preferably provided with an upraised portion or thickened area 27 along each of its longitudinally spaced edges 24. The purpose of this configuration is to provide for a slight binding effect when adjacent base sections 22 are flexed downwardly by the weight of the vehicle wheel as they are drawn under the wheel. This slight binding effect then tends to assure that the tongue 34 will release engagement with its respective groove as soon as the respective base sections have traveled a sufficient distance past the wheel that they no longer support any weight.

If the base sections 22 maintained their original configuration, they may continue upward into contact with the frame or fender of the vehicle and prevent further travel of the strip 20.

It should be pointed out however, that this thickened edge portion 27 is not necessary if the tongue and grooves are constructed such that they do release once weight is no longer supported. However, in mass production, it may be too costly to maintain close enough tolerances to assure this and the binding effect described would remedy any problem in this area by providing a biasing force to assure release of the tongue from its mated groove.

Now referring specifically to FIG. 5, to extricate a wheel from a rut or hole in the mud/snow or the like, the user places the forward end of strip 20, indicated at the initial position at numeral 4, against the forward portion of the wheel 50. The centerline position of the wheel 50 is progressively indicated by numerals 1, 2 and 3 and the corresponding position of the leading edge of strip 20 is indicated by numerals 4, 5 and 6.

Side walls 28 preferably are provided with downwardly extending components 48 which function as runners or guides on the lower surface of the strip. Their purpose is to cut into the ground surface which tends to provide lateral stability to the longitudinal alignment of the strip 20.

However, these guides 48 should be relatively slight or even non-existent on the first four or five base sections 22, to permit the track to be drawn under the wheel without significant resistance. Alternatively, a tongue or thin extension, not shown, could be added to the forward end if desired to provide ease of starting the strip 20 under the wheel.

As the vehicle wheel is caused to rotate in the forward direction indicated in FIG. 5, a slight amount of forward pressure to cause the first base section 22 to contact the wheel might be necessary to start it under the tire when a particularly deep rut or hole is encountered. Otherwise, any slight forward movement of the wheel would normally be sufficient to cause the base section 22 to sufficiently engage the tread on the tire and begin to pull the strip under the tire or wheel 50.

It should be noted that strip 20 may be flexed upwardly as seen in FIG. 1 through a relatively significant angle such that it readily may be laid along the ground and still be fed into a hole or rut as shown in FIG. 5. Further, it may be rolled up in the opposite direction to that shown in FIG. 1 for storage purposes.

As the initial base sections 22 of the forward end of strip 20 are drawn under the tire 50, the angular configuration between the first five wall means 28 are sufficient to permit the strip to assume the basic configuration of the tire 50 and the rut or depression in the ground surface. For example, this angular configuration may begin at approximately 16 to 18 degrees, with a decrease, for example, of about 1 to 1½ degrees between each adjacent edge of the adjacent wall means 28. This angular relationship depends upon the desired length of the strip and the degree of graduation between the angles defined. As the middle portion of the strip is approached, the decrease in the angular relationship is reduced to about ½ degrees between adjacent edges of the wall means.

However, as the strip 20 continues to be pulled under the tire, the weight of the vehicle tire causes the base sections to pivot or flex relative to one another about their longitudinal edges 24 to move the wall means 28 toward one another. As each of the edges 30 carrying a tongue 34 engage into the adjacent slot 36, a limit is defined to prevent any further relative movement between the adjacent wall means in that direction. This tends to stiffen that portion of the strip carrying any vehicular weight and begins to define a ramp under the wheel.

As the wheel continues to rotate and the strip continues to be pulled under the tire, the decreasing angular relationship defined between the wall means 28 of each base section 22 define a ramp of lesser slope. It should be pointed out that the forward end of strip 20 which has passed beneath the wheel, rests first at the rearward portion of the rut and then is forced to climb the slope of the rut as the tire pulls more of the base sections 22 of the strip 20 under the tire.

Depending upon the severity of the depth and the nature of the slope of the forward and rearward faces of the hole or rut into which the wheel is disposed, the driving wheel will climb the ramp formed by the traction strip 20 or pull more of the strip under the tire. If the resistance of pulling the strip along the ground under the wheel 50 is greater than the resistance of the wheel climbing forward on the strip, the tire 50 would normally be able to roll forward out of the rut or hole.

However, if the reverse is true, as the wheel rolls forward a small distance up the ramp formed by strip 20 and the resistance to climbing up the strip 20 becomes greater than the resistance to pulling more base sections 22 under the tire, then the strip 20 will be drawn further under the tire 50, as long as the tire 50 has a sufficient frictional engagement with the base surfaces 26 of strip 20.

During this time, it should be apparent that the further strip 20 is pulled under the tire, the fixed ramp formed by the decreasing angular relationship between adjacent wall means 28 will effectively form a supporting bridge between the wheel 50 and the bottom of rut or hole in which the wheel 50 is disposed. Also, the further the strip 20 is drawn under the wheel 50, the slope of the strip presented to the wheel 50 effectively becomes less severe.

Therefore, the wheel 50 will effectively be raised relative to the bottom of the rut as shown in FIG. 5 by the dotted outlines of wheel 50 where the centerline of the wheel positions are indicated at 2 and 3 unless the wheel drives itself out of the rut prior to pulling the length of the strip under the tire.

If the forward and rearward slope of the rut or hole is not exceptionally severe and the ground surface supporting strip 20 is very slippery, the rotating tire 50 may well pull the strip 20 through almost its entire length until the gripper member 46 is reached. At that point, the weight of the vehicle which is being supported by the fixed ramp formed by strip 20 will tend to cause the gripper member to embed itself into the ground surface to effectively anchor that end of the strip 20. In most circumstances, sufficient traction should be provided to permit the tire to move forward free of the rut. This is particularly true when one considers that the ramp effect that occurs forms a bridge that effectively reduces the depth of the hole into which the wheel was disposed.

Normally ground surfaces such as mud, soft earth, or snow into which the wheel may embed itself would not present any problem relative to forming a depression having a slope so severe which would render the present invention ineffective.

Therefore it should be readily apparent from the foregoing description that the traction track constructed in accordance with the present invention provides a novel and improved means for the motorist to aid himself from a situation in which the driving wheel is mired in mud, snow or the like.

The track not only provides a traction surface of increased frictional resistance but further tends to reduce the slope of the depression which a driving wheel usually creates when it becomes stuck in a soft, slippery ground surface to greatly reduce the task of extracting the wheel from this type of situation.

What is claimed is:

1. A portable traction track for the driving wheel of a vehicle disposed in a ground surface depression significantly greater than the surrounding ground surface level comprising, in combination, an elongate strip having a traction surface including a plurality of flexibly connected base sections; each of said base sections provided with opposing side wall means; said side wall means being provided with longitudinally spaced edges, each of said edges having a predetermined angular relationship with the edge of the side wall means associated with the immediately adjacent base section to define an increasing limitation of the degree of flexible movement of said base sections relative to one another in at least one direction for a given major portion of the length of said strip; releasable locking means provided between each of said side walls upon engagement between adjacent edges thereof to reinforce the limitation of the movement of said base sections; whereby said strip tends to form a decreasing degree of curvature relative to the configuration of said depression upon increasing the length of said strip inserted under said driving wheel within said depression.

2. The traction track defined in claim 1 wherein certain of said base sections include vertically extending laterally spaced runners disposed on the groundwardly facing surface of the base sections.

3. A traction track for a driving vehicle wheel comprising, in combination, a plurality of base sections flexibly connected to one another to form a generally elongate strip, each of said base sections including a top and bottom surface and integrally formed longitudinally extending side portions, each of said side portions having outer longitudinally spaced edges forming a predetermined angular relationship with the edges of the side portion of the immediately adjacent base section with said angular relationship between adjacent sets of said side portions generally decreasing from the forward to rearward end of said strip for at least a substantial portion of the length of said strip and each of said side portions being provided with a tongue and groove on opposing longitudinally spaced edges thereof adapted to mate with a corresponding tongue and groove provided on the next adjacent side portions upon movement of said side portions toward one another; the top surface of each of said base sections provided with an abrasive surface; and a gripper member connected to the rearward most base section.

4. A traction track for a driving vehicle wheel comprising, in combination, a plurality of base sections forming an elongate strip, each of said sections being connected to one another along a longitudinally spaced edge for relative pivotal movement about said edge of said base section; said base sections including opposing longitudinally extending side walls provided with longitudinally spaced edges forming a predetermined angular relationship with the edges of the side walls of the immediately adjacent base sections, the angular relationship between the edges of adjacently disposed side walls generally decreasing from the forward toward the rearward end of said strip to define a limit to the degree of pivotal movement at least in one direction of each of said base sections relative to the next adjacent base section upon the engagement of said edges of said side walls with the next adjacent side walls.

5. The traction track defined in claim 4 wherein said side walls of each of said base sections include releasable locking means which cooperate upon engagement between the immediate adjacent side walls with one another to fix the degree of pivotable movement of said base sections relative to one another upon the application of a load in at least one direction upon said base sections.

6. A portable traction track for the driving wheel of a vehicle comprising, in combination, a plurality of base sections connected to one another along longitudinally spaced edge portions to form an elongate flexible strip having an upwardly facing traction surface, at least a substantial portion of adjacently disposed base sections each being provided with opposing laterallly spaced side walls, each of said side walls including longitudinally spaced edges having a predetermined angular relationship with the edge of the side wall associated with the immediately adjacently disposed base section to define a stop means limiting the flexible movement of said base sections provided with side walls at least in one direction, and wherein said angular relationship between said edges of said side walls generally decreases from the forward toward the rearward end of said strip.

7. A portable traction track for the driving wheel of a vehicle disposed on a surface depression significantly greater than the surrounding ground surface comprising in combination, an elongate strip having a traction surface formed by a plurality of relatively rigid base sections each provided with vertically disposed side wall means, each of said base sections being connected to an adjacent base section along a longitudinally spaced, laterally extending edge for relative pivotal movement about said edge; stop means mounted on each adjacent base section which interferingly engage one another to limit the degree of said relative pivotal movement between said base sections in at least one direction, said stop means being formed to increasingly limit the degree of said relative movement between said base sections in a direction from the front toward the rear of said strip upon the application of a vertical downward component of force by said driving wheel upon said base sections whereby said strip tends to form a decreasing degree of curvature relative to the configuration of said depression upon increasing the length of said strip inserted under said driving wheel within said depression.

* * * * *